(No Model.)
J. R. McGEE.
COMPOST DISTRIBUTER.
No. 421,300. Patented Feb. 11, 1890.
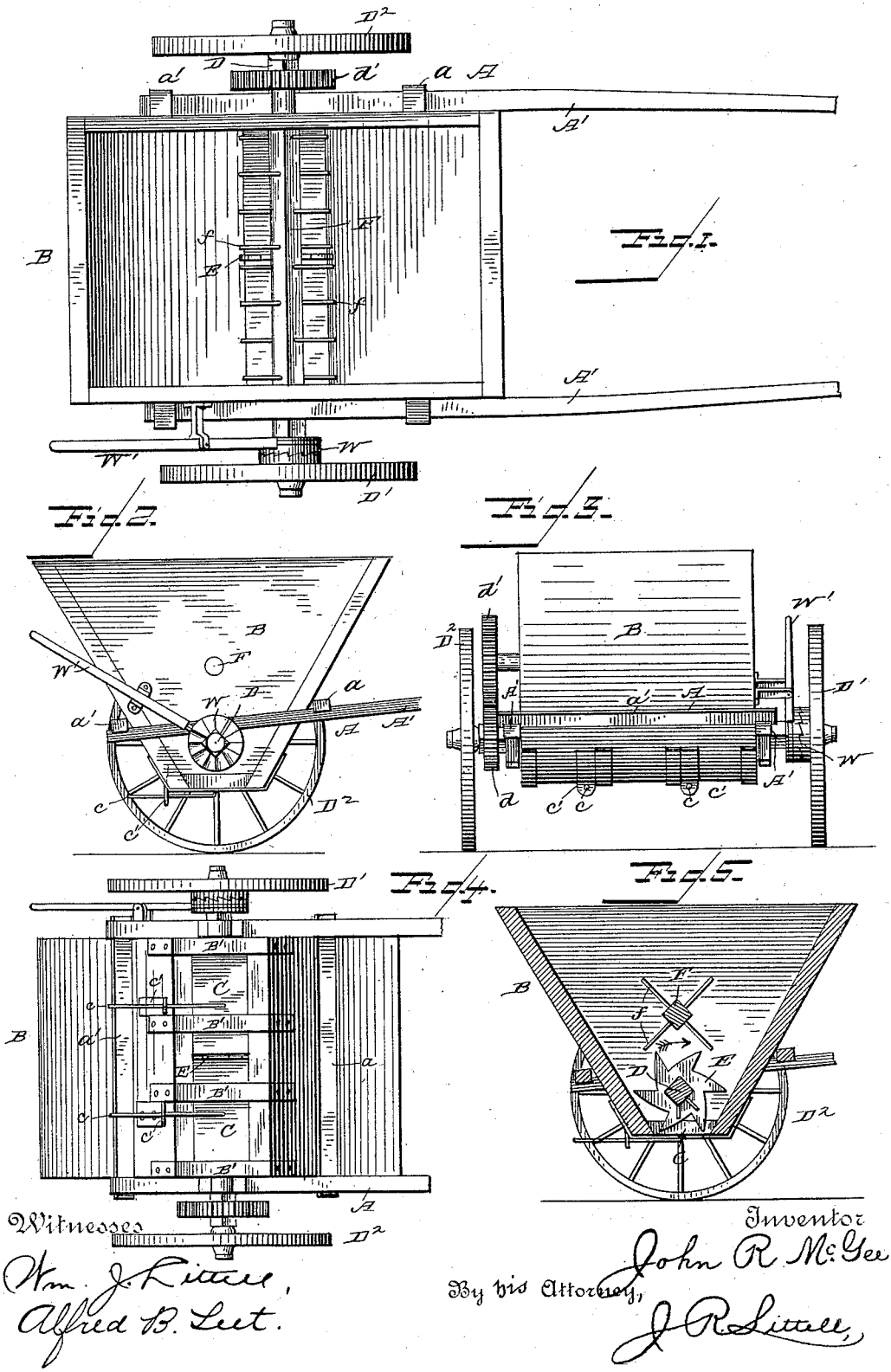
Witnesses
Wm. J. Little,
Alfred B. Leet.
Inventor
John R. McGee,
By his Attorney,
J. R. Little.

UNITED STATES PATENT OFFICE.

JOHN R. McGEE, OF DUE WEST, SOUTH CAROLINA.

COMPOST-DISTRIBUTER.

SPECIFICATION forming part of Letters Patent No. 421,300, dated February 11, 1890.

Application filed May 25, 1889. Serial No. 312,104. (No model.)

*To all whom it may concern:*

Be it known that I, JOHN R. McGEE, a citizen of the United States, residing at Due West, in the county of Abbeville and State of South Carolina, have invented certain new and useful Improvements in Manure or Compost Distributers, of which the following is a specification.

My invention relates to manure or compost distributers; and it consists in the novel construction and arrangement or combination of parts, as will be more fully hereinafter described and claimed.

The object of my invention is to provide a machine of the character set forth having a convenient and efficient construction. I attain this object by the construction illustrated in the accompanying drawing, wherein like letters of reference are used to designate similar parts in the several views, and in which—

Figure 1 is a top plan view thereof. Fig. 2 is a side elevation. Fig. 3 is a rear elevation. Fig. 4 is a bottom plan view. Fig. 5 is a vertical sectional view.

A indicates the main frame, composed of the front and rear cross-bars $a$ and $a'$, connected by the rear extensions of the thills A'. Within this frame a hopper or receptacle B is mounted, provided with front and rear sloping sides and depends below the said frame. The bottom of said hopper is open and the two lower edges of the front and rear boards extend below the side boards, and thereby form a substantial dovetailed slideway. Within said slideway double slides C are mounted. Iron straps B' extend across the said open bottom of the hopper B and form guards to hold the slides in place against the weight of the material above and also re-enforce the said bottom part of the hopper, against spreading. The said slides C are shorter than the width of the hopper-bottom for a purpose more fully hereinafter described, and are operated by levers $c$, secured thereto and passing through or suitably attached to depending brackets $c'$. An axle D passes transversely through the bottom of the hopper B and projects outwardly therefrom on each side to provide a space for other operating mechanism. On the ends of said axle bearing-wheels D' and D² are mounted in the usual manner. The said wheels D' and D² are so mounted on the axle D as to have free movement. To cause said axle to revolve, I provide a clutch mechanism W in connection with the wheel D'. This mechanism is operated by a rearwardly-projecting lever W', and is adapted to be shipped into connection and unshipped, as will be readily understood. The central part of the axle has a toothed feed-wheel E mounted thereon, which projects within or through the opening left between the two ends of the slides, as hereinbefore referred to. This feed-wheel runs in the direction of the arrow, Fig. 5, to throw the manure or compost rearward, and also disintegrates or separates the same while passing through the wheel-opening. The clutch mechanism W controls the action of said wheel E.

On the axle D, adjacent to the wheel D², a gear-wheel $d$ is mounted, which meshes with a larger gear $d'$ above, mounted on the projecting end of a shaft F, transversely passing through the hopper or receptacle above the axle and has agitator-arms $f$ mounted thereon. It will be readily seen that this shaft is caused to revolve in a direction opposite to that of the axle D. By this means the manure or compost is fed down to the distributing-wheel E and prevented from packing in the hopper.

By adjusting the slides C the quantity of manure fed from the hopper is regulated.

The efficiency and utility of the improvement will be readily apparent and appreciated.

Having thus described my invention, what I claim as new is—

In a compost-distributer, the combination, with the hopper formed of the vertical side walls and inclined front and rear walls converging toward the bottom of said hopper, the said inclined walls extending slightly below the vertical side walls, thereby forming a dovetailed way, of the transversely-adjustable slides having their edges beveled to work in the dovetailed way, said slides forming the bottom of the hopper and adjustable to and from each other to make an opening in the center of the hopper for the discharge of compost, a lever attached to the hopper and connected with each slide to regulate the same, metallic straps arranged beneath the slides and connected with the front and rear inclined walls, a feed-wheel adapted to revolve in the opening in the bottom of the hopper, and an agitator journaled above the feed-wheel, all of said parts being arranged and adapted to operate substantially as shown and described.

In testimony whereof I affix my signature in presence of two witnesses.

JNO. R. McGEE.

Witnesses:
H. C. POORE,
J. A. PUCKETT.